JOHN B. ROOT.

Improvement in Steam Generators.

No. 4,690 Reissued Jan. 2, 1872.

Witnesses:

Chas. Nida

H. L. Wattenberg

Inventor:

John B. Root per [illegible]

Atty

THE NORRIS PETERS CO., PHOTO-LITHO., WASHINGTON, D. C.

UNITED STATES PATENT OFFICE.

JOHN B. ROOT, OF NEW YORK, N. Y., ASSIGNOR, BY MESNE ASSIGNMENTS, OF ONE-THIRD INTEREST TO THOMAS C. M. PATON.

IMPROVEMENT IN STEAM-GENERATORS.

Specification forming part of Letters Patent No. 74,146, dated February 4, 1868; reissue No. 4,082, dated July 26, 1870; reissue No. 4,690, dated January 2, 1872.

*To all whom it may concern:*

Be it known that I, JOHN B. ROOT, of the city, county, and State of New York, have invented certain new and useful Improvements in Steam-Boilers; and I do hereby declare that the following is a full, clear, and exact description of the same, reference being had to the accompanying drawing.

In what are called water-tube steam-boilers—that is to say, steam-boilers the water-spaces of which consist of horizontal or inclined tubes and in which the upper tube or tubes furthest from the fire, or the upper portions of some of them, may constitute steam-spaces—some better provision than has heretofore been made is necessary for obtaining dry steam by separating from the steam the water that is carried up by or with it to the steam-room or steam-drum. It is to make such provisions that is the principal object of this invention; and, with this end in view, the invention is based upon the fact that a gas and a liquid mixed together in the form of foam will separate from each other by the gravitation of the liquid, if sufficient time be afforded for the purpose; also, that the separation can be hastened by retarding the passage of the mixture and allowing the steam to ascend.

My invention consists of certain constructions and combinations of the parts of a water-tube boiler, of which the most important is the construction of the up-take for the steam from the water-tubes of an ascending series of chambers connected by passages of smaller sectional area than that of the chambers, so that the ascent of the foaming mixture of steam and water tending to issue from each tube is restrained, the steam and water tending to escape through the passages is retarded, and time is afforded for the separation of the steam from the water during its upward passage through the up-take. The said constructions and combinations are specified at the close of this schedule; but in order that my invention may be fully understood I will proceed to describe a steam-boiler in which it is embodied in the best form known to me at the date of my original application for the patent.

Figure 1:
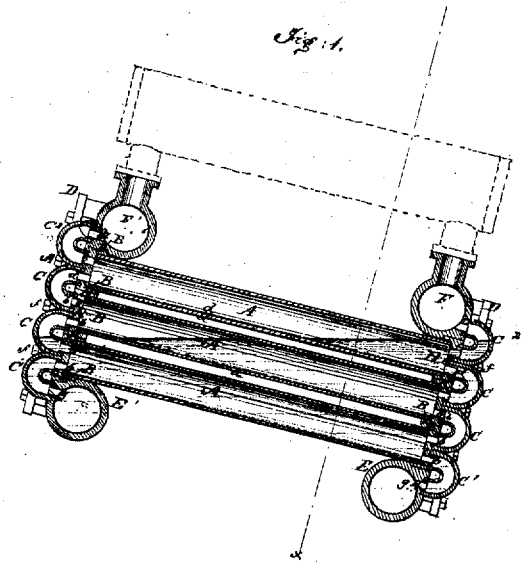
Figure 3:
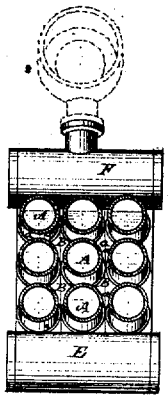
Figure 2:
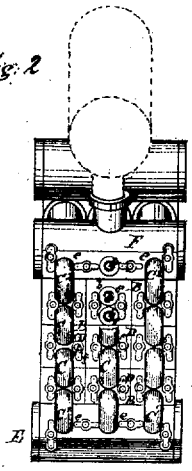

Figure 1 in the drawing represents a longitudinal vertical section of a boiler; Fig. 2, an end view thereof, with a portion of one of the connections removed; and Fig. 3, a transverse section of the same through the line *x x*, shown in Fig. 1.

Similar letters of reference indicate corresponding parts in the several figures.

The boiler consists of a number of separate tubes containing the water to be heated, and which are arranged in tiers, one above the other, over the fire-place or furnace, the fire playing outside of the tubes, such tubes being connected with each other at each end by means of connections forming passages, and connecting each tube with the one above and below it, whereby a circulation is kept up, foaming prevented, and the steam kept drier.

The ends of the boiler are constructed of a series of plates or separate heads of square, parallelogrammic, or other form, a separate plate or head being fitted to each end of each tube, and serving, by means of apertures therein, into which the connections are fitted and secured, to connect the water-tubes with each other. Such water-tubes are also placed in an inclined position to the horizon, so that the water-line of the boiler may cross such tubes.

With the main water-tubes there may be also cross water-pipes connected therewith by means of connections, as aforesaid, and arranged to communicate with said tubes, or certain of them, at their ends, without breaking the continuity of the tubes.

A A represent tubes made of wrought-iron or other suitable metal, of any proper length, diameter, or thickness of metal, and of any desired number, arranged to lie one above another, and of which there may be several series lying side by side, with flue or air-spaces between them or around each of such tubes. Such tubes are placed in an inclined position to the horizon, as shown in Fig. 1, sloping upwardly from the rear toward and over the fire-place, by which arrangement the water-line of the boiler may cross the several tubes, and a portion of the internal space of such tubes, or of the upper series or tiers of tubes above the water-line, and thus constitute a steam-chamber. Such tubes A A are, each and all, secured or fitted at their opposite ends with independent plates or blocks B B, of square or parallelogrammic or other form, which form the heads of such tubes, and which, when combined and in their places, constitute the ends or general heads of the boiler, and through which the communication of the tubes A A with each other, in each vertical series, is established by means of the connections hereafter described. If preferred, the tubes A A may be of cast metal, with the plates or heads B B cast thereon.

To make or effect the communication between the tubes A A, each plate or head B B is provided or constructed with apertures *b b* of smaller diameter than the tubes, the one lying above the other; and around each of such apertures is made an annular socket, *c*, within which may be inserted an India-rubber ring, *d*, or other packing; and into these sockets the ends of the connections C C are fitted, said connections connecting the upper aperture *b* at each end of the one tube A with the lower aperture *b* at the same end of the next tube A above, and being secured or held to their places by clamping-bars D D lapping over or on lugs or projections *e e*, and fastened by nuts and stud-bolts *f* connected with the plates or heads B B, such clamping-bars being preferably so constructed and arranged as that any one bar serves to bear on or hold two of the connections C C.

The connection above described of the water-tubes and the connecting-pipes or connections by means of socket-joints, inclosing packing, effects the double purpose of making the joints tight, and of permitting the tubes to move slightly in case of unequal expansion and contraction.

In Fig. 2 one of the connections is omitted and another represented as broken, to expose the apertures *b b* and sockets *c c* to view. Cross-pipes E E′ F F′ are or may be arranged above and below the tubes A A at opposite ends, which cross-pipes should be connected with the upper and lower rows of the tubes A A, by or through connections $C^1$ $C^2$, connecting the nearest of the apertures *b* of said tubes with apertures *g* in a similar socketed manner to that used with the connections C C, and being similarly held or secured by clamping-bars and stud-bolts connected with the cross-pipes, such clamping-bars being arranged to lie at right angles to those previously described, so that all the clamps or clamping-bars may be alike, as also all the plates or blocks or heads B and connections C C and $C^1$ $C^2$, and likewise main pipes or tubes A A. By such similarity or duplication of parts there is secured not only economy of construction, but increased facility is provided for fitting, changing, or renewing of parts, and extending or diminishing, by increasing or lessening the number of tubes, the capacity of the boiler at pleasure. By this construction, also, it will readily be perceived that any of the tubes A A may be removed without disturbing the others.

The connections, being of much smaller caliber than the tubes A A, may be made light, and will be strong enough, when of cast-iron, to prevent them bursting in advance of or sooner than the tubes A A, while the tubes A A, not being connected either with each other or the cross-pipes excepting through the end plates or heads B B, are not cut away or weakened.

If desired, the lower arms or legs of the connections may be made longer than the upper ones, so as to admit, in an inclined position of the boiler, as represented, of the ends of the tubes A A and their plates or heads B B lying in a vertical plane. In some cases the upper, E′, of the lower cross-pipes may be dispensed with, the same serving mainly as a bearer; also, where a steam-drum (shown in dotted outlines) is not used, or under other circumstances, the lower one, F, of the upper cross-pipes may likewise be omitted, leaving the upper one, F′, of such pipes to answer as a steam-chest or drum; and, indeed, both such upper cross-pipes F F′ and the steam-drum may be omitted, as the upper ends of the upper rows of the main or water-tubes A A may, from their inclined position, constitute of themselves a steam-chest or drum.

The boiler generally, at least at its sides, may be set in brick-work or other setting; but its ends, if desired, may be covered with sheet-iron or other jackets to prevent loss by radiation from said ends and the connection.

In such a tubular boiler each tube acts as an independent small boiler, in which steam is generated, and the upper end of each tube constitutes a chamber, in which the steam collects previous to its exit in an upward direction. The steam, escaping from the chamber of a lower tube and tending to pass upward, is conducted by the connections into the chambers formed by the ends of the tubes above that in which it is generated, so that said chambers and the passages in the connections between them form the up-take for the steam. The steam is generated in such a boiler with great speed, foam is produced, and the steam tends to pass from the chamber at the end of the tube intimately mixed with water. As, however, the passage from each chamber to the one next above is of smaller sectional area than the area of the chamber, the passage of the mixture of steam and water is retarded, the steam permitted to escape from the water, and the escape of the water is obstructed or prevented. As this restraining tendency is in operation upon the mixed steam and water in each chamber, by reason of the contracted passage leading to the one next above, the practical effect is that the steam tends to issue from the uppermost chamber unmixed with water, or in a much drier state than it would do if the up-take were of equal sectional area throughout.

I am aware that water-tube boilers have been constructed with a contracted outlet from the tubes into a receptacle. I therefore do not lay claim to a contracted outlet from the tubes into a general up-take for all the tubes or a part thereof. Neither do I claim in this division the peculiar features of construction here represented and described, which were made the subject of another division and granted to me in reissue patent No. 4,083, dated July 26, 1870; but

What I claim as my invention, and desire to secure by Letters Patent, is—

The construction of the steam up-take of a water-tube boiler, of a series of chambers arranged one above another and connected by contracted passages, substantially as before set forth.

Also, the combination, in a boiler, of a series of inclined water-tubes by means of contracted passages, connecting the higher ends of the tubes with each other, substantially as before set forth.

Also, the combination of a series of water-tubes with a corresponding series of heads, constructed with exit-apertures of smaller sectional area than the sectional area of the tubes, substantially as before set forth.

Also, the combination, in a water-tube boiler, of the series of water-tubes with a corresponding series of heads, which, united, constitute the ends of the boiler, and which are connected with each other by means of contracted passages, substantially as before set forth.

JOHN B. ROOT.

Witnesses:
H. L. WATTENBERG,
G. M. PLYMPTON. (148)